United States Patent
Pope et al.

(10) Patent No.: US 10,659,390 B2
(45) Date of Patent: May 19, 2020

(54) NETWORK INTERFACE DEVICE

(71) Applicant: XILINX, INC., San Jose, CA (US)

(72) Inventors: Steven L. Pope, Cambridge (GB); David J. Riddoch, Fenstanton (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/721,613

(22) Filed: Sep. 29, 2017

(65) Prior Publication Data
US 2019/0104086 A1    Apr. 4, 2019

(51) Int. Cl.
*H04L 12/933* (2013.01)
*H04L 29/06* (2006.01)
*H04L 29/08* (2006.01)
*H04L 12/26* (2006.01)
*H04L 12/24* (2006.01)

(52) U.S. Cl.
CPC ............ *H04L 49/15* (2013.01); *H04L 63/123* (2013.01); *H04L 67/2804* (2013.01); *H04L 69/22* (2013.01); *H04L 69/324* (2013.01); *H04L 41/5009* (2013.01); *H04L 43/026* (2013.01); *H04L 43/028* (2013.01)

(58) Field of Classification Search
CPC ....... H04L 69/22; H04L 49/90; H04L 67/327; H04L 49/15; H04L 69/324
See application file for complete search history.

(56) References Cited

U.S. PATENT DOCUMENTS

| | | | |
|---|---|---|---|
| 8,255,574 B2 | 8/2012 | Amutham | |
| 2002/0161919 A1* | 10/2002 | Boucher | H04L 29/06 709/238 |
| 2005/0047329 A1* | 3/2005 | Almog | H04L 12/4679 370/225 |
| 2006/0095754 A1 | 5/2006 | Hyder et al. | |
| 2007/0088957 A1* | 4/2007 | Carson | G06F 21/64 713/176 |
| 2009/0276377 A1* | 11/2009 | Dutta | G06Q 30/02 706/12 |
| 2014/0330792 A1 | 11/2014 | Bhatt | |
| 2016/0261482 A1 | 9/2016 | Mixer et al. | |
| 2016/0330301 A1* | 11/2016 | Raindel | H04L 67/327 |
| 2018/0152540 A1* | 5/2018 | Niell | H04L 41/0816 |

OTHER PUBLICATIONS

EP18197498.1—Extended European Search Report dated Feb. 28, 2019, 9 pages.

* cited by examiner

*Primary Examiner* — Shukri Taha
(74) *Attorney, Agent, or Firm* — Haynes Beffel & Wolfeld, LLP; Ernest J. Beffel, Jr.; Paul A. Durdik (57) ABSTRACT

A network interface device is provided in a first device. The network interface device comprises an interface configured to receive a first input from a network. The network interface device also has at least one processor configured to provide an output in dependence on contents of the first input and provenance information which uniquely identifies the network interface device, the output being output via the interface to the network.

23 Claims, 8 Drawing Sheets

NETWORK INTERFACE DEVICE

FIELD

Some embodiments relate to a network interface device, a method and system.

BACKGROUND

Network interface devices NIDs, sometimes referred to as NICs, are provided in devices to allow the devices to output and/or receive data, often in the form of packets. The data in packets may be passed through several devices, sometimes being manipulated on the way before being provided to an ultimate destination.

SUMMARY

According to an aspect, there is provided a network interface device in a first device, said network interface device comprising: an interface configured to receive a first input from a network; and at least one processor configured to provide an output in dependence on contents of said first input and provenance information which uniquely identifies the network interface device, said output being output via said interface to said network.

The first input may comprise provenance information of at least one network interface device from which said first input has been received via said network.

The first input may comprise at least one packet or at least one frame.

The output may comprises a digest.

The digest may be a digest of data comprising at least one of:
a digest of payload data in said first input;
a digest of payload data in said output;
a digest of application level objects;
a digest of application level data units; and
a digest of storage packet data units.

The digest may comprise a digest of provenance information for a plurality of network interface devices.

The digest may be provided in at least one packet or frame.

The digest may be appended as metadata to at least one packet or frame.

The output may comprise at least one packet or frame of data.

The output may comprise at least a part of at least one packet or frame of said first input with said provenance information.

The provenance information may be provided in a payload of at least one packet or frame of data of said output.

The provenance information may be provided as metadata.

The provenance information may be provided in a field in one or more output packets or frames of said output.

The provenance information may be appended to one or more output packets or frames in said output.

The provenance information may be used to perform a hash function on at least part of said data of a packet.

The output may comprise provenance information associated with one or more network interface devices from which said first input was received.

The interface may be configured to receive a plurality of inputs each having respective provenance information, said inputs being combined, said at least one processor being configured to provide an output comprising at least a part of provenance information associated with each of said plurality of inputs.

The at least one processor may be configured to provide time stamp information in said output.

The provenance information may comprise at least one of:
an identifier of said network interface device;
a unique serial number of said network interface device;
an identifier of a location of said network interface device;
an identifier of said first device;
an identifier of a domain with which the network interface device is associated; and
a signature using a security key of said network interface device.

The network interface device may comprise at least one memory configured to store one or more rules, said at least one processor being configured to apply said rules to at least one of said input and said output, at least one rule using provenance information associated with at least one of said network interface device and a further device.

At least one of said one or more rules may be configured to cause provenance information to be stored to one or more applications.

At least one of said one or more rules may be configured to cause data from one or more applications to be output with provenance information associated with at least one of said network interface device and a further device.

The at least one of said one or more rules may be configured to generate an alert in response to one or more conditions relation to provenance information associated with at least one of said network interface device and a further device.

According to another aspect, there is provided a system comprising: at least one data store configured to store at least a part of outputs from a plurality of different network interface devices, said outputs comprising provenance information associated with the respective different network interface devices; and at least one processor configured to analyze said provenance information.

The at least one processor may be configured to determine if one or more conditions associated with said provenance information have met.

According to another aspect, there is provided a method comprising receiving a first input from a network at an interface of a network interface device in a first device; and providing an output to said network via said interface in dependence on contents of said first input and provenance information which uniquely identifies the network interface device.

The first input may comprise provenance information of at least one network interface device from which said first input has been received via said network.

The first input may comprise at least one packet or at least one frame.

The output may comprises a digest.

The digest may be a digest of data comprising at least one of:
a digest of payload data in said first input;
a digest of payload data in said output;
a digest of application level objects;
a digest of application level data units; and
a digest of storage packet data units.

The digest may comprise a digest of provenance information for a plurality of network interface devices.

The digest may be provided in at least one packet or frame.

The digest may be appended as metadata to at least one packet or frame.

The output may comprise at least one packet or frame of data.

The output may comprise at least a part of at least one packet or frame of said first input with said provenance information.

The provenance information may be provided in a payload of at least one packet or frame of data of said output.

The provenance information may be provided as metadata.

The provenance information may be provided in a field in one or more output packets or frames of said output.

The provenance information may be appended to one or more output packets or frames in said output.

The provenance information may be used to perform a hash function on at least part of said data of a packet.

The output may comprise provenance information associated with one or more network interface devices from which said first input was received.

The method may comprise receiving a plurality of inputs each having respective provenance information, combining said inputs, and providing an output comprising at least a part of provenance information associated with each of said plurality of inputs.

The method may comprising providing time stamp information in said output.

The provenance information may comprise at least one of:
an identifier of said network interface device;
a unique serial number of said network interface device;
an identifier of a location of said network interface device;
an identifier of said first device;
an identifier of a domain with which the network interface device is associated; and
a signature using a security key of said network interface device.

The method may comprise applying rules to at least one of said input and said output, at least one rule using provenance information associated with at least one of said network interface device and a further device.

At least one of said one or more rules may be configured to cause provenance information to be stored to one or more applications.

At least one of said one or more rules may be configured to cause data from one or more applications to be output with provenance information associated with at least one of said network interface device and a further device.

The at least one of said one or more rules may be configured to generate an alert in response to one or more conditions relation to provenance information associated with at least one of said network interface device and a further device.

A computer program comprising program code means adapted to perform the herein described methods may also be provided. In accordance with further embodiments apparatus and/or computer program product that can be embodied on a computer readable medium for providing at least one of the above methods is provided.

In the above, many different embodiments have been described. It should be appreciated that further embodiments may be provided by the combination of any two or more of the embodiments described above.

Various other aspects and further embodiments are also described in the following detailed description of examples embodying the invention and in the attached claims.

BRIEF DESCRIPTION OF DRAWINGS

Some embodiments will now be described by way of example only with reference to the accompanying Figures in which.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
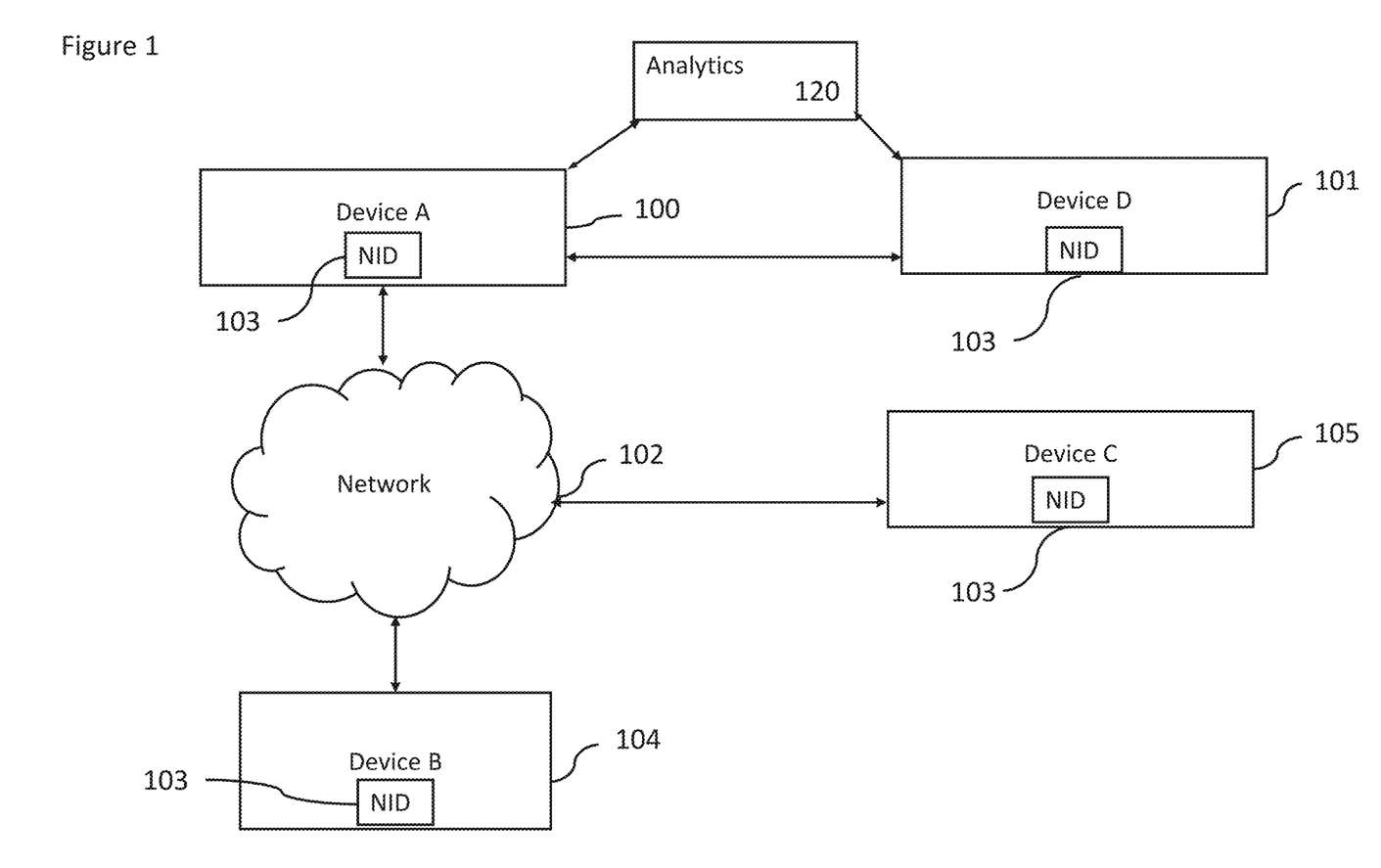
FIG. 1 shows a first example architecture in which embodiments may be provided.

Reference is made to FIG. 1 which schematically shows a first example architecture in which some embodiments may be provided. The example architecture has a first device A which is referenced 100, a second device B which is referenced 104, a third device C referenced 105, and a fourth device D referenced 101. Each device has a respective network interface device NID 103. In the example architecture, a network 102 is provided which allows the various devices to communicate. In the example, the first device A 100 is configured to receive messages from the network and output messages onto the network. The fourth device D is configured to receive messages from the network and output messages onto the network via the first device A. In some embodiments, the first device A and the fourth device D may be part of a network such as an internal company network or the like.

A packet may be received at the second device B from the third device C, via the network. The received packet will have provenance information of the NID of the third device. The NID of the second device will modify the packet at least to add in the provenance information of the NID of the second device. The modified packet is then provided to the first device via the network. The NID of the first device will modify the packet at least to add in the provenance information of the NID of the first device. That further modified packet may then be provided to the fourth device. The packet which is provided to the fourth device will have provenance information of each of the NIDs that the packet has passed through. This provides a digest. The form of this digest or form of that data will be described in more detail later.

In this example embodiment, four devices with respective NIDs are shown. However, it should be appreciated that this is by way of example only and there may be more or less than four devices.

An analytics function 120 is provided. The function is configured to receive data from either or both of the first and fourth devices, in this example embodiment.

In some embodiments, at least the digest of the packet is provided to the analytics function.

Figure 2:
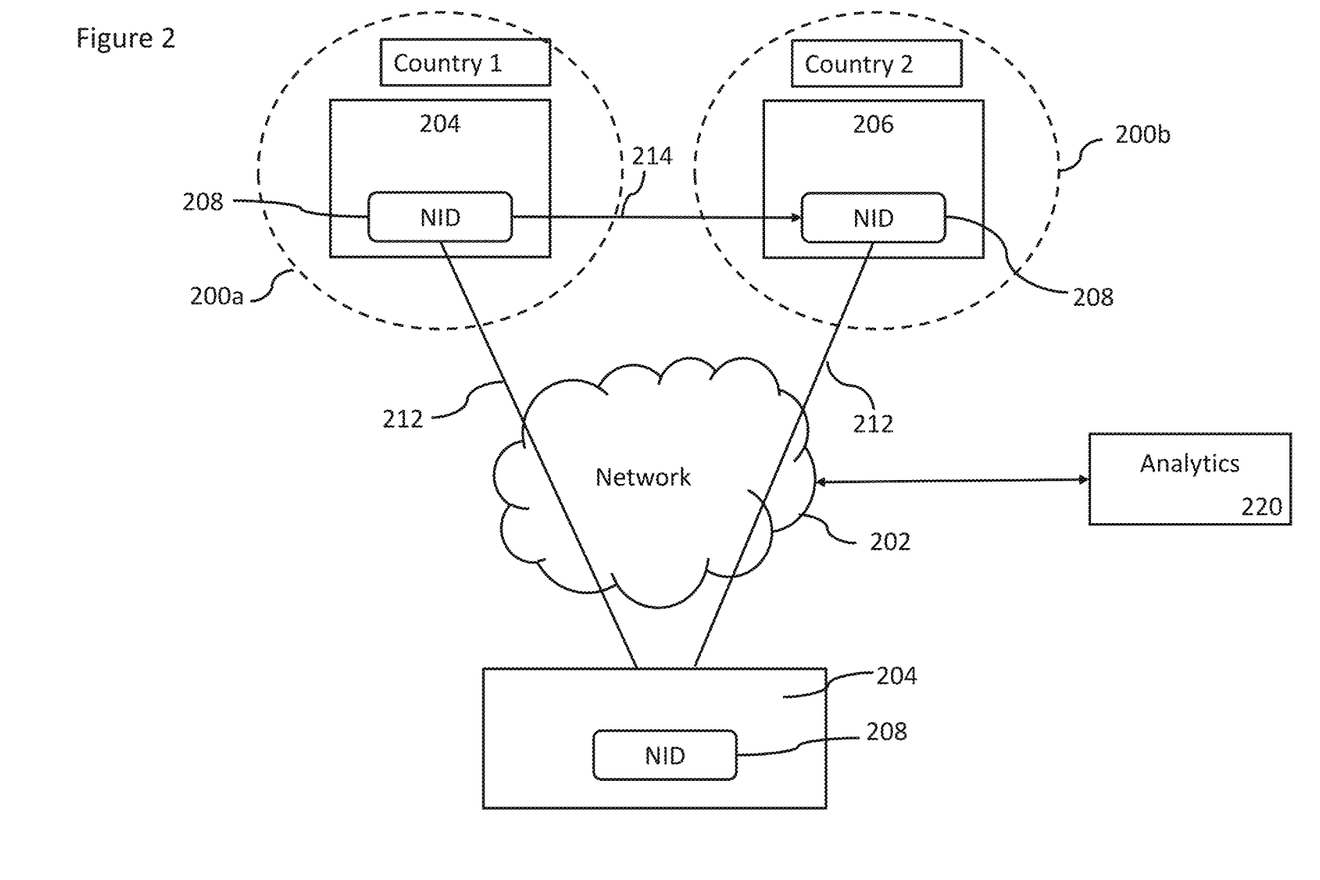
FIG. 2 shows a second example architecture in which embodiments may be provided.

Reference is made to FIG. 2 which shows another example architecture in which embodiments may be used. In this example a first device 204 is in a first location, a second device 206 is in a second. The first and second locations may be different countries, for example. The first device and second device each have a NID 208. The first and second devices are configured to communicate via a link 214. A further device 208 is configured to communicate with the first and second device via a network 202. This communication is referenced 212. The further device has a NID.

As with the arrangement shown in FIG. 1, each time a packet is processed by a NID, provenance information of that NID is added to the packet to provide a digest.

An analytics function 220 is provided and receives data via the network.

Figure 3:
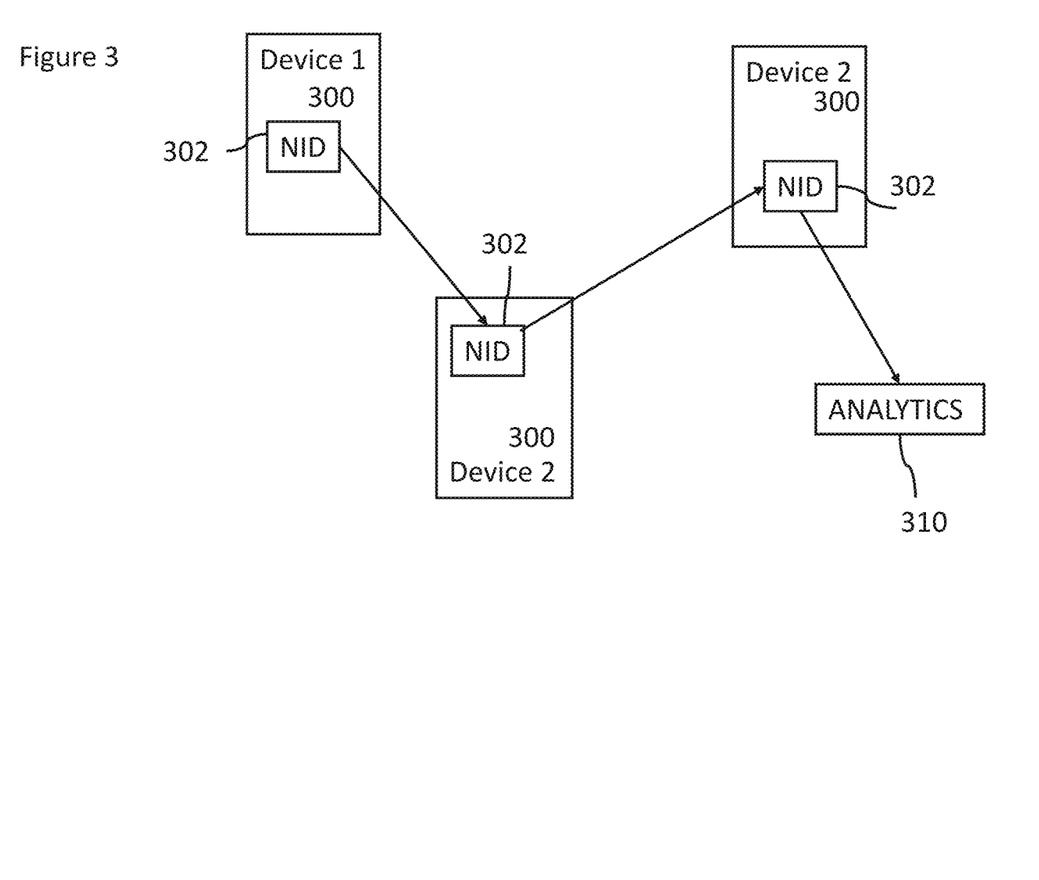
FIG. 3 shows a third example architecture in which embodiments may be provided.

Reference is made to FIG. 3 which shows another example architecture in which embodiments may be provided. The architecture shows by way of example three different devices 300, device 1, device 2, and device 3. Each device has a respective NID 302. In this scenario, the first device is configured to provide data to the second device which in turn is configured to provide data to the third device. The third device is configured to provide an output to an analytics function 310.

As with the arrangement shown in FIG. 1, each time a packet is processed by a NID, provenance information of that NID is added to the packet to provide a digest.

In embodiments, provenance information is added to the data each time it passes through a NID. That provenance information will indicate that the data has been received by a particular NID.

In some embodiments, a digest is provided which will include provenance information for each NID that the data has passed through.

Optionally, the digest will provide order information to indicate the order in which the data passed through the NIDs. This information may be provided by the order of the provenance information within the digest and/or by using time stamp information.

The digest may alternatively or additionally be generated at an analytics function.

Figure 4:
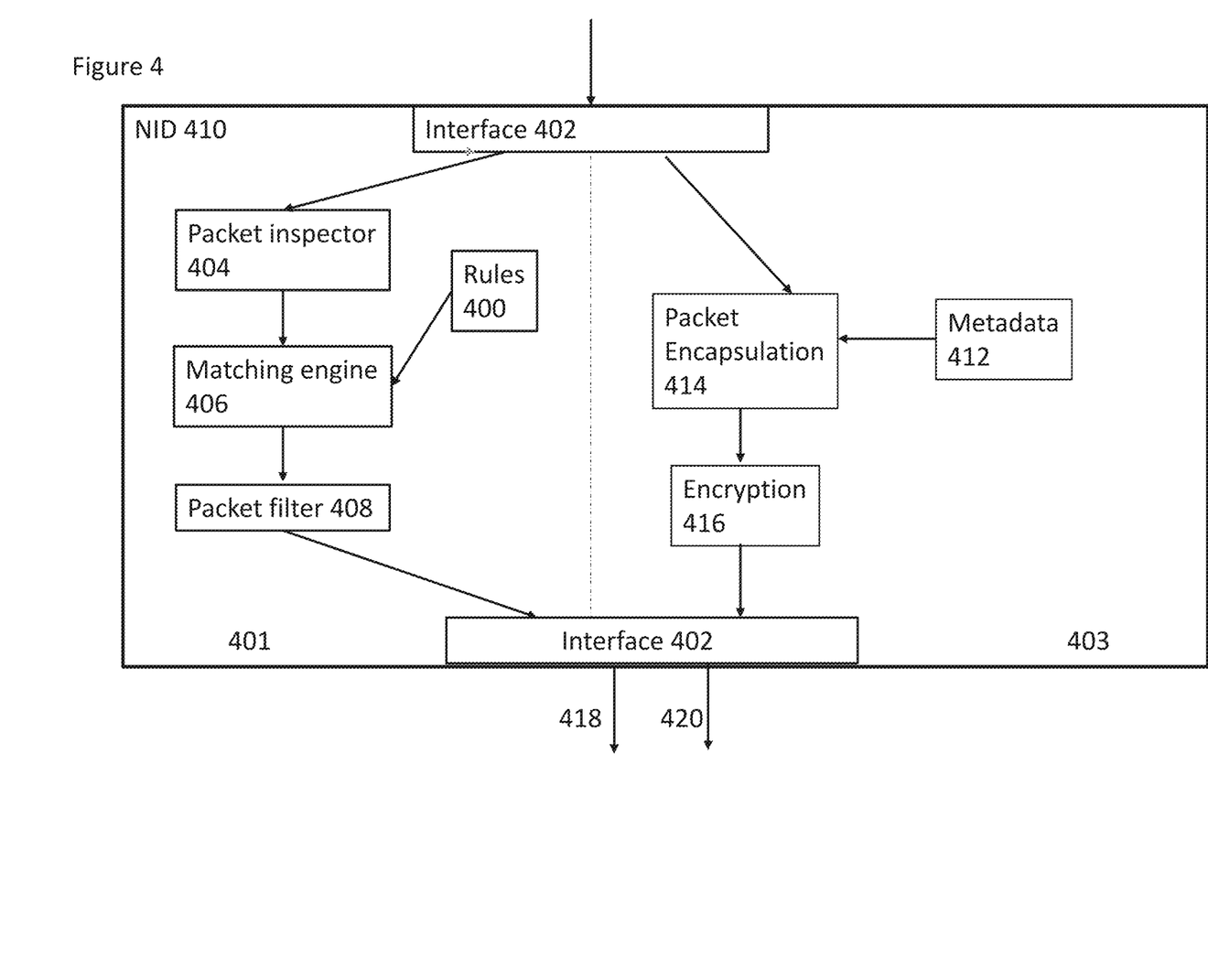
FIG. 4 shows an example network interface device.

Reference is made to FIG. 4 which shows a NID 410 of an embodiment. The NID has an interface 402 which is configured to receive packets which are to be output by the NID via that interface 402. For clarity an input instance of the interface and an output instance of the interface is shown but in practice there is a common interface for input data and output data. Other embodiments may of course have separate input and output interfaces.

The various blocks shown in FIG. 4 represent functions provided in the NID. The data path in the NID implement a chain of micro engines which parse, classify, match then perform an action for each ingress/egress frame. This will be discussed in more detail later.

Schematically, the so-called normal processing of the packet takes place in part 401 of the NID. It should be appreciated that the representation of the NID shown in FIG. 4 represents the functions which are performed by the NID. One or more of the functions shows in FIG. 4 may be performed by computer software running on hardware, with program code stored in memory. One or more functions may alternatively or additionally be performed by hardware circuitry.

The processing which takes place in part 401 will now be described. At least part of function 401 may be performed in a reconfigurable logic device, such as an FPGA, an ASIC or the like. Part 401 comprises a packet inspector 404, a matching engine 407 and a packet filter 408. A data store 400 includes rules and corresponding actions that are to be performed.

The rules may be simple rules or more complex rules. For example a rule may define one or more of a black list of flows which are not permitted, a white list of flows of permitted flows, and one or more limits such as connection rate limits, bandwidth limits and packets. The rules may define the actions to be taken. For example a packet may be dropped or allowed to be delivered to its destination. Some rules may be dependent on the provenance information. Alternatively or additionally, an event may be generated and output on a control channel. Events may be sent separately to the captured packets on the control channel. In some embodiments, events may be considered as another form of meta-data.

The packet filter may perform an action specified in the data store which corresponds to the rule which has been triggered.

In order to perform rules that relate to limits such as number of packets from a particular destination or a total number of packets or a number of packets from a particular NID, the matching engine is configured to maintain state sufficient to allow the matching engine to perform such rules. The matching engine could be configured to store the state at the data store. For example, if a rule causes the matching engine to monitor the total number of packets, the matching engine would maintain state identifying the total number of packets and update that state on receiving new packets. This would, for example, allow the matching engine to identify when a predetermined cap has been reached and to, in response, perform a corresponding action identified in the data store.

The rules that are to be enforced are written to data store.

The packet inspector 404 is arranged to parse incoming packets received over interface 402 so as to enable the relevant rules for each packet to be identified in the data store 400. Rules could be selected from data store 400 on the basis of any suitable information in the packets including the provenance information. For example, different rules could be applied to flows directed to different endpoints. The rules may themselves be programs expressed in a language such as BFP or regular expressions.

It should be appreciated that more than one rule may be applied to a given packet.

The packet inspector may be configured to perform a lookup into the data store on the basis of given identifiers. For example, data representing the source/destination of a packet may typically be included in the header of a data packet. An indication that the packet passes the filter may be provided to a packet encapsulation function as is discussed later.

Reference is made to part 403. In this part, the packet which is received via the interface 402 is passed to a packet encapsulation function 414 which also receives metadata from the metadata function 412. The metadata will be described in more detail later. The encapsulation function also receives an output from the packet filter indicating if the packet passes the filter. In some embodiments, the packet encapsulation function may receive the packet data from the packet filter.

The packet encapsulation function will encapsulate the packet with the meta data. Optionally, this encapsulated packet is passed to an encryption function, which encrypts the packet or part of the packet. The output packet is passed to the interface.

It should be appreciated that in one modification, the encryption may be performed before encapsulation. In some embodiments, the encryption and encapsulation may be performed together. The encryption is optional in some embodiments.

In alternative embodiments, instead of encryption, authentication of messages may be used.

In some embodiments, the metadata comprises network interface provenance information. The metadata may comprise time stamp information which gives the time at which the packet was received and/or is to be output and/or when the provenance information was added.

However, there are alternative or additional examples of metadata that may be included. For example, metadata could include an event which was generated as a result of the NID processing that packet.

The meta data may alternatively or additionally contain any state which was used in the processing which generated the event—such as a connection rate, a timeout, an error condition and/or the like.

In some embodiments, the provenance information and/or metadata can be appended to the packet. In other embodiments an encapsulation is defined for a structured object containing one or more fields which represent metadata and a packet contents field.

In some embodiments, the packet filter outputs the packet with the provenance information which is then transmitted to the next device.

Alternatively or additionally a copy of the packet to which the provenance information and/or metadata has been added is directed to an analytics function. It should be appreciated that the digest may be created by the analytics function in these embodiments.

In some embodiments, a summary or a digest of a plurality of packets with the associated provenance information may instead be forwarded to the analytics function.

In some embodiments, the digest may comprise a digest of payload data.

In some embodiments, the digest may comprise a digest of a storage packet data unit PDU. It should be appreciated that many PDUs may be contained in a Layer 2 frame or span a layer 2 frame.

In some embodiments, the digest may comprise a digest of file objects.

In some embodiments, the digest of an application level object or data unit may be provided.

It should be appreciated that the digest may be created by the analytics function in alternate embodiments.

Figure 8:
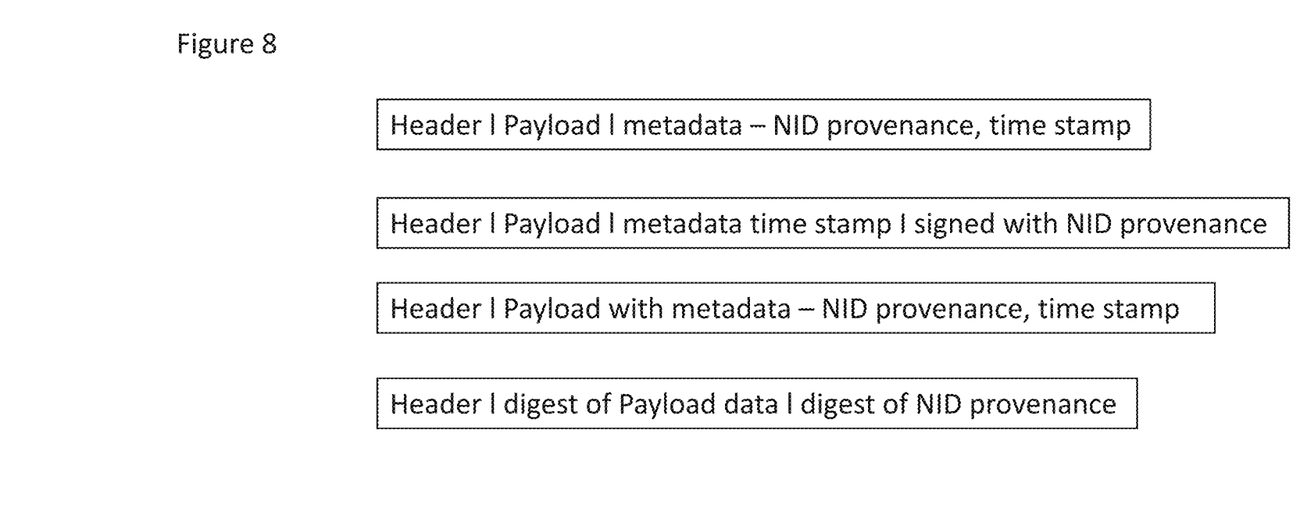
FIG. 8 shows some examples of outputs from a network interface device

Some examples of outputs from a NID are shown in FIG. 8.

1. There is a header field, followed by a payload. Meta data is appended. This may be NID provenance information and optionally time stamp information.

2. There is a header field, followed by a payload. Meta data is appended—this may be time stamp information. This is then signed using the NID identifier.

3. There is a header field, followed by a payload. Meta data is inserted into the payload. This may be NID provenance information and optionally time stamp information.

4. There is a header field, followed by a digest of payload data followed by a digest of NID provenance information.

In some embodiments, the digest may be of payload data, a digest of storage PDU (note that many PDUs can be contained in a Layer2 frame or span a layer2 frame) or a digest of an application level objects or data units.

In some embodiments, each time a message or packet passes through a network interface device, provenance information from that network interface device is provided. For example, in the context of the arrangement shown in FIG. 3, as the message is passed through each of the devices, provenance information from each of the network interface devices is added. Accordingly, a digest may be provided in that message which will indicate the provenance of each of the network interface devices that the message has passed through. In some embodiments, this may be provided along with time stamp information. In other embodiments, the order of the network interface device provenance information may indicate the order in which the message has passed through the network interface devices.

The digest which is generated is provided to a respective analytics function. The information provided by the may be used in any suitable way.

The provenance information may be provided in a field. This field may be added to an end of the packet or inserted into the body of the packet. The provenance information may be provided by performing a hash function using the provenance information.

Provenance information may comprise information specific to the NID. For example, the information may be one or more of a unique NID ID, generated using a private key and/or public key. For example a signature is provided, which may be generated using a per NID private key. That signature may be verified using a NIDs public key. The provenance information may comprise information relating to the physical location of the NID. For example, the provenance information may comprise one or more of an identity of a data centre, a network to which the NID and its associated device are a part, a geolocation, and provenance information generated by the physical infrastructure such as the identity of a connected data lake or storage pool. For example, the provenance information may be a customer, end user or the like identity. In some embodiments a second private key is provided so that the provenance meta data can be signed twice, once to indicate the NID identity and one again to include the identity of the customer, data center, end-user or the like.

In some embodiments, the provenance information may comprise time stamp information, such as previously mentioned.

It should be appreciated that the provenance information may be made up of one or more different ones of the provenance information. For example in one embodiment, a key specific to the NID may be used to sign one or more other ones of provenance information mentioned previously.

In other embodiments, the provenance information may be concatenated in a field.

The provenance information may be provided in a header field in some embodiments.

In some embodiments, the NID may accumulate records to prepare a digest. This digest, as mentioned previously may have a copy of the data of the message or just summary data.

In some embodiments, a digest of a frame is hashed using provenance information associated with the NID. This may be for example using the identity of the NID or a key associated with the NID.

The digest provided by a NID may have one or more of a frame number and time stamp which is signed using the NID provenance information.

In some embodiments, the analytics function may collect digests against, for example, the NID identifier. This may be with the original message or with a reference to the original message.

In some embodiments, a log may be generated at the analytics function with provenance for all NICs associated with given data.

Each NID may in some embodiments be configured to direct a copy of the packets which it receives to a capture buffer which is part of the analytics function. The system may be set up so that any packets which are received by NID from a network and/or packets which are to be put onto the network by the NID are sent to the capture buffer. In some embodiments, one or more NIDs may only direct a copy of incoming packets to the capture buffer, and/or one or more NIDs may only direct a copy of outgoing packets to the capture buffer and/or one or more NIDs may direct a copy of incoming and outgoing packets to the capture buffer. Some or more of the packets may be replicated. Some or all of the content of a given packet may be replicated.

The analytical engine may be configured to generate the digests from a number of different NIDs. It should be appreciated that the capture buffers may be omitted in some embodiments and the data simply passed to the analytical engine which has some data storage capacity. In this scenario, the analytical engine would process the data substantially in real time. However, it is preferred that there is a capture buffer as this provides elastic storage as the quantity of data captured may depend on the time frame over which the data is being captured and/or volume of data. In some scenarios, it is desirable to have data for a given time period to assist in determining if a feature is normal or if an alert should be generated. The data in the capture buffers may thus be stored for at least the given time period. The packets will also be directed by the NID to their intended destination via, for example via the network. In embodiments, the normal processing of a packet by a NID is unaffected by the directing of the copy to the capture buffer.

In some embodiments, the analytics function may uses digests to track a same frame which has been observed at various points in a network to collate all provenance information for that frame.

The analytics function is one example of a function which can use the provenance information. For example the analytics may be configured to generate alerts.

In some embodiments, an alert may be generated in response to one or more particular rule(s) being violated. There may be a plurality of different rules which have respective different conditions which cause an alert to be generated. An alert may provide information which indicates the reason for the generation of the alert.

An alert may be generated when the digest indicates that a network flow has come via a particular device which is contrary to the one or more rules. For example one or more NID is determined to be carrying network flows from outside an expected domain.

An alert may be generated when a message is determined to have been routed over a network which is outside the expected security domain.

An alert may be generated when a service level agreement has been determined to be violated.

In some embodiments, data from a plurality of different sources may be combined. The data from different sources may be stored in a database.

In some embodiments, the NIC may combine the provenance information for all frames received. This combined information may be added to one or more or all output frames. This would ensure that for example the data or output generated by an application (such as a map/reduce node) is tagged with at least the provenance of all the inputs to the calculation. By the hardware by storing and manipulating this information, it is possible to ensure that provenance is not lost through the application/computation layers at the node. For example one node or device may receive a plurality of packets from a plurality of different devices. Each packet may be tagged or associated with the respective provenance information. The node will use data from a plurality of packets from different devices to provide an output. The output will have the provenance information of the node as well as that associated with packets used in the determination of that output.

In some embodiments, such a combination process may reduce the provenance operation for example to a union operator, rather than a concatenation operation. For example not all provenance information would be required to be combined. For example time stamp information might not be required but location of the sources of the data may be required.

Such a combination or reduction operation depends on the application and may prevents the provenance information growing every larger. For example, if every packet received at a node contains the {source data-centre location and a time-stamp} then included in the output provenance information which is included on every frame output by that node could be the set of all data sources, such as data-lake identity or countries, which may have provided an input to the computation performed at that node.

In some embodiments, the data may be stored with at least a part of the NID provenance information. The provenance information can thus be used to preserve the origin of the data.

The provenance information can be used to prevent the writing of data from a particular source. The database may be configured to only write data to the database from a selected set of NIDs. Alternatively or additionally, the database may be configured to have a blacklist of NIDs and will only write data for NIDs not on the black list.

In some embodiments, data from a plurality of sources may be combined to form new data. The provenance data may be used to prevent the unauthorized combination of data or to retain information about the respective sources of the data.

There may be bars on combining data based on location, security level, compatibility of the data and/or any other requirement. The provenance information may be used to ensure compliance with one or more these requirements.

In content delivery networks, the use of the provenance information may provide improved security of information because origin of data can be determined Where the provenance information comprises time stamp information, this may be used by any analytics function to monitor the performance of a network or networks. The provenance information and time stamp information may be used, for example to determine latency.

In some embodiments, the provenance information may be used for security monitoring. This may be in for example a data centre or the like.

In some embodiments, the provenance information may be used for anomaly detection and/or detection of threats.

In some embodiments, the provenance information may be used for network planning/learning. For example the analytics may see new data paths.

In some embodiments, the provenance information may be used to prevent data from being moved from a particular location and/or control where the data is output to. Rules may be set up based on the provenance information to prevent this In some embodiments, the provenance information may be used to reject or accept data based on provenance. This may be performed in one or more NIDs. The NID may be able to reject data based on the identity of one or more NIDs in the received message.

Some embodiments may be used where security in a network or transactions across networks is desired. Some embodiments may be used in internal networks across distributed sites For example, different ones of the network interface devices may be located in different countries. There may be a bar on certain types of data being passed from one country to another. The analytics device is able to determine if the integrity of the data has been maintained by determining that data has not passed through a barred country.

Networking protocols have evolved to support the provision of an entirely virtualized LAN (local area network). For example tunneling protocols such as VXLAN (virtual extensible LAN) and NVGRE (network virtualization using generic routing encapsulation) provide a consumer with an entirely virtualized network. The virtualized network may comprise one or more of virtual switches, hosts, network appliances and storage pools. For a service or cloud provider the cloud based platform can be provisioned and resource balanced over large pools of physical infra-structure. This can provide economies of scale and access to technologies which engender high efficiencies or access to cheap energy sources. Service (cloud) providers may automate the provision of the underlying cloud infrastructure. This may allow entire networks, applications and data to be instantiated, replicated and migrated seamlessly between different parts of the physical infrastructure. This may be done such that this is transparent to the consumer or client.

However in some situations, this flexibility to migrate between different parts of the physical infrastructure may be disadvantageous. For example an application whose components are supported by physically separated parts of the cloud infrastructure may suffer performance penalties. Another example is where data is required to reside within a geographic region for legal or security reasons and the cloud infrastructure is provided by resources in two or more geographic regions or countries.

Whilst a cloud service provider may offer guarantees on physical locality on the particular infrastructure resources supporting a particular application, these guarantees may be inadvertently breached. Since the consumer or client is presented with an entirely virtualized infra-structure, currently the consumer is unable to verify or enforce these guarantees. Since the cloud service provider manages its service provision through mobility in order to achieve desired levels of operational efficiency there is always the possibility that an automation or human operator error could cause a computer container (or VM virtual machine) or a storage component to be migrated to a part of the infrastructure which does not satisfy the geographic location, for example.

It may be that a virtual network segment could inadvertently be carried over an inappropriate territory even if the final geographic location satisfies the location requirements.

Alternatively or additionally a virtual network segment may be carried over physical infrastructure which does not match for example a SLA (service level agreement). A SLA may specify a certain link speed, a particular service level, a minimum service level, a particular application response time and/or other criteria. A network link or virtual network lane which is supposed to be running at a certain link speed may in fact be misconfigured or faulty.

In some embodiments, analysis of provenance information may be used to enforce/verify that SLA requirements have been met, for example in terms of location of data, response times of applications and/or permitted combinations of data.

This analysis of provenance information may be provided by an analytics engine and/or in a NID of a device and/or in a device with a NID.

It is envisaged that operational efficiency demands in the future may mean that physical infrastructure workloads are required to be migrated over different geographic regions as a matter of course. For example renewable energy sources are not always dependable or fluctuate according to weather patterns or time.

Some embodiment may allow the use of virtualized infrastructure whilst providing a more reliable guarantee to a customer/consumer as to the domain (for example geographical location) in which the virtualized infrastructure resides. This may be without revealing details of the underlying physical infrastructure. In some embodiments, this may be achieved by providing provenance information. In particular, because provenance information is added every time a packet passes through a device, the adherence to a particular requirement or requirements can be demonstrated.

The devices of any of the previous architectures may be computer devices. The computer devices may comprise one or more computers and/or one or more servers and/or any suitable one or more client devices.

In some embodiments, the device may comprise a virtualized device.

In some embodiments, the device may instead be considered to be an infrastructure. That infrastructure may be made up of a plurality of physical devices which support a plurality of virtualized devices.

Some embodiments may be used in any scenario where there is at least a first physical infrastructure and a second physical infrastructure and where one or more requirements of a user is not satisfied by one of the infrastructure and migration of virtual resources between the physical infrastructures is possible. The first and second infrastructure may be separately located or located in a common location. The first and second infrastructure may be part of a common infrastructure or physically different infrastructure.

Some embodiments may be used in any scenario where there is at least a first device and a second device and where one or more requirements of a user is not satisfied by one of the devices and transfer of data between the devices is possible. The first and second devices may be separately located or located in a common location. The first and second devices may be part of a common network or physically different networks.

Alternatively or additionally, the different infrastructures or devices may be in one or more of different data centers, domains and territory.

Some embodiments may be used in the context of the so-called cloud architecture. It should be appreciated that in other embodiments any other suitable infrastructure may be used. For example, the infrastructure may comprise one or more of a secure infrastructure, a remote infrastructure, data center infrastructure; infrastructure provided as a service or any other suitable infrastructure. The secure infrastructure may for example be a control network for an airport.

In the previously described embodiments, reference has been made to network interface device NID. This is sometimes referred to as a NIC. A network interface device could be provided in any suitable form, including as a peripheral device or integrated with hardware of a host data processing device. A network interface device provides an interface to the network for use by its associated data processing device or the like.

The NIC or NID may logically be a component of a server in some embodiments.

The NID may be considered to be a physically separate and distinct piece of hardware and logically distinct network entity.

In some embodiments, the NID may be implemented by a hardware device. In other embodiments, the NID may be implemented by a hardware device along with software in an operating system for example.

The component such as the NID or the like may comprise at least one processor and at least one memory.

In some embodiments, the NID may be programmed at manufacture or at a trusted customer location to securely store provenance information or information used to generate provenance information. In some embodiments, at least some of the stored provenance information may be unique to the particular component.

The device programming at manufacture may be implemented so as to not reveal the final key stored within the device, for example by the modification of a key provided to the device by the device itself using a source of random entropy. Techniques such as this would allow a device private key to be generated in a secure manner.

The relevant key should be stored securely as each NID or the like allows. This may be by means of nonvolatile memory.

Generally the NIC will have some processing capability provided by at least one processing device. The processing device may be any suitable processing device and may for example be an FPGA (Field Programmable Gate Array), an application processor, a micro-engine, a network processing unit, a sequencer or the like. The NIC may have some memory capability which may for example be provided in the FPGA or by any other suitable memory.

In the previously described embodiments, reference has been made to network interface device. However, embodiments may be used with any other suitable physical component. By way of example only, that physical component may alternatively or additionally comprise a hypervisor, a switch, a load balancer, a firewall and/or the like.

Some embodiments may be used where at least some virtualization is supported so that the physical components supporting a particular service, application, database and/or the like can change. Other embodiments may be used in non-virtualized implementations.

It should be appreciated that the source of packets may be any suitable source of packets. A server is one example of such a source. Another example of a source may be a switch or a device connected to the network. The packets may be generated inside an internal system and/or be received from an external system. Each entity which sends packets is usually also able to receive packets. In embodiments, each entity which receives and/or transmits packets is associated with a NID. An entity may share a NID with at least one entity, have its own NID or have more than one NID.

The network may be an internal network, an external network or both.

Figure 6:
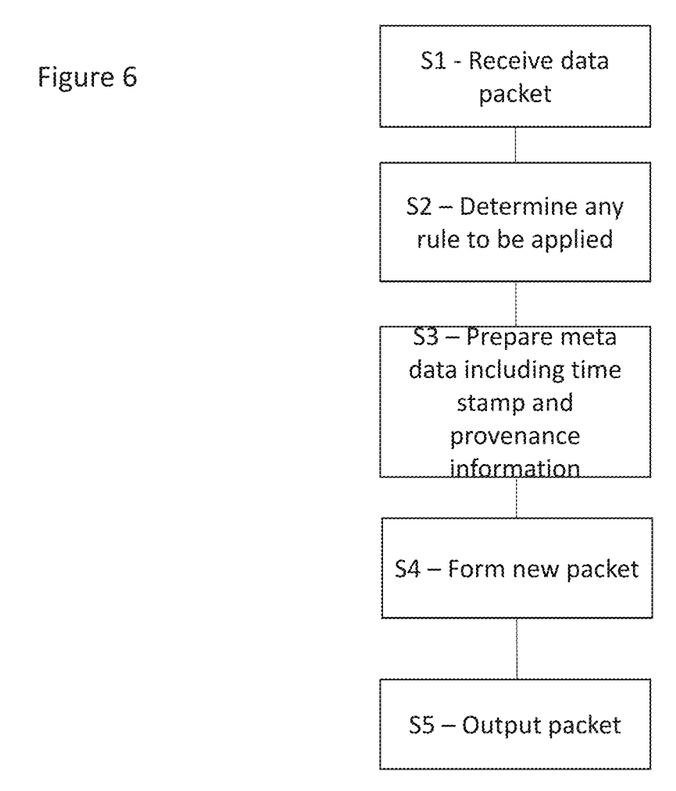
FIG. 6 shows a method of an embodiment.

Reference is made to FIG. 6 which schematically shows a method carried out in the NIC.

In step S1, a packet is received from another device.

In this example, the packet may be checked in step S2 to determine if any rule is to be applied to the packet. In some embodiments, the rule may relate to provenance information, such as previously described.

The NID will in step S3 prepare the provenance information. For example this may be in the form of metadata and also include a time stamp.

In step S4, the packet data is encapsulated with the metadata to form a packet.

In step S5, this packet is output by the NID.

It should be appreciated that this method may be modified to support any of the previously described embodiments.

Figure 5:
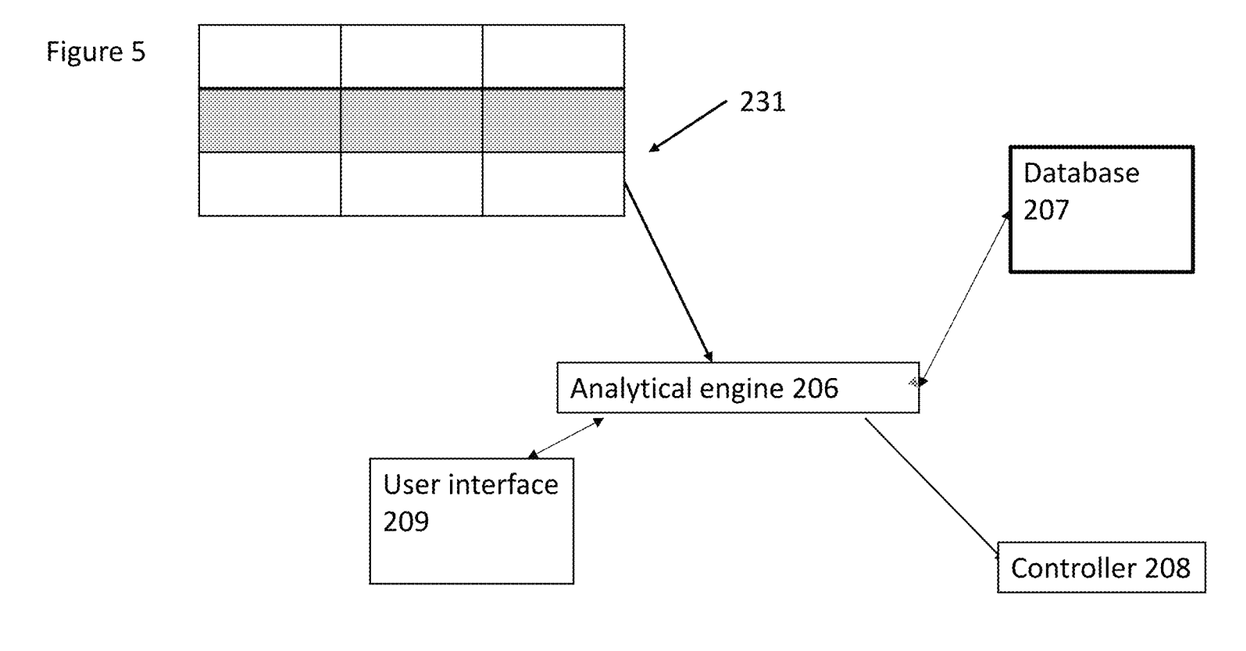
FIG. 5 shows an analytics system.

Reference is made to FIG. 5 which shows schematically shows the functionality associated with one example of an analytics function. This may be provided by an analytics system. The analytics system may comprise one or more apparatus.

The analytics system may have one or more processors or processing functions. For example, an analytical engine may be provided. The analytical engine is configured to receive data, such as previously discussed from one or more NICs. This will include at least provenance information. This data is represented by reference number 231.

This data may be analyzed as it is received and/or stored in a database for later analysis.

The analytical engine may be configured to carry out any of the previously discussed analysis.

For example, the analytical engine learn what constitutes normal behavior of the network and when to raise an alert.

In some embodiments, information may be provided to a user interface 209. For example the user interface may be in the form of a graphical display.

In some embodiments, one or more alerts or information may be provided to another computer implemented process for control.

In some embodiments, the analytical engine may be configured to implement a machine learning function or computer program. The machine learning function may be configured to recognize for example cascaded transactions. The machine learning function may be configured to extract features which are considered to be normal. The analytical engine uses what is considered to be normal to determine when there is abnormal behavior.

Some embodiments may use a machine learning algorithm such as a deep learning algorithm. The algorithm uses layers of processing units where successive layers use the output from the previous layer as an input. The analysis may involve classification and pattern analysis. For example data associated with a flow received by the analytical engine may be or attempted to be categorized as belonging to or satisfying a particular policy using the provenance information. Any flow which does not belong to any policy may cause an alert to be generated and output by the user interface.

In some embodiments, the machine learning algorithm may be is configured to define a new policy for that flow.

It should be appreciated that any suitable technique may be used to perform analysis. For example correlation of different packets or data may be performed.

The analytical engine may be provided with an AI or deep learning or any other suitable learning algorithm to learn what constitutes normal behavior.

In some embodiments, the analytical engine may be configured to receive provenance data associated with a large number of NIDs. For example the number of NIDs may be in the thousands.

In some embodiments a NID will have a secure connection with a controller 208 in a trust domain. This allows the rules which are applied by a NID to be updated. These rules may be relate to provenance such as previously discussed. The controller may 208 may receive an output from the analytical engine 206 which is used by the controller to set up or modify the rules of a NID. In some embodiments, the function of the controller is provided by the analytical engine and can be regarded as being part of the analytical engine.

Some embodiments may have provenance rules provided at the NID and enforced at the NID. For example the provenance rules may comprise one or more of:

storing the union of the provenance of all frames received for flows to a given application;

ensuring that the frames which are output by that application onto the network are tagged with at least the union of the input data and ensure that this output provenance is within the rules stored at the NIC for this application; and support a control plane (for example a connection to the controller) which allows provenance rules to be set, inspected and receive alerts when violations have occurred.

Figure 7:
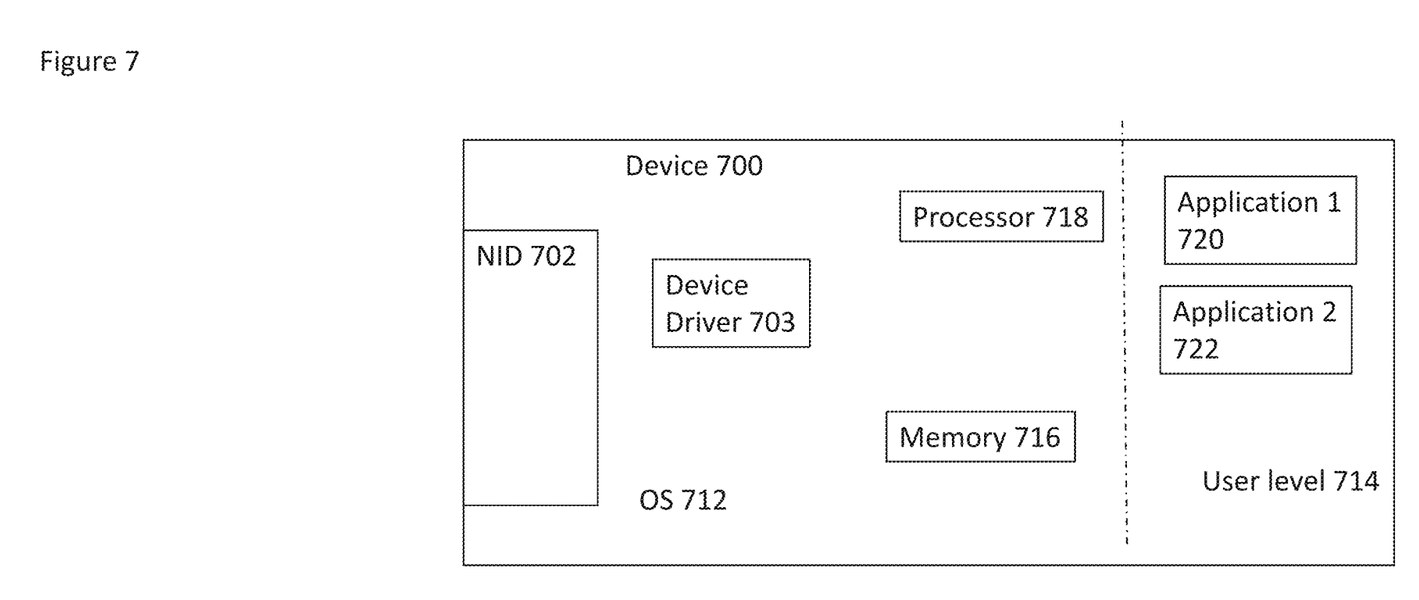
FIG. 7 shows a device having a network interface device.

Reference is made to FIG. 7 which schematically shows an example device 700 with a NID 702 which is configured to execute at least some of the firmware and at least one memory 106 which is configured to store at least some of the firmware code.

The device 700 has a device driver 703 for the NIC 4, in some embodiments. The device may have an operating system OS part 712 operating at a higher level of privilege to a user level part 714. The device driver is provided in the OS part. The OS part may comprise one or more processors 718. The OS part may comprise and/or have access to one or more memories 716.

The user level part may support one or more user level applications. In the example shown in FIG. 7, the user level part supports a first application 720 and a second application 722. In some embodiments, the NIC may provenance data to application processing layers—either in the NIC or to one or more of the applications.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Network interface devices, sometimes referred to as NICs are provided in devices to allow the devices to output and/or receive data, often in the form of packets.

The complexity of processing on some NICs has increased substantially to the point where entire applications may be executed on the NIC. Complex operations such as capture, flow steering, telemetry, firewalling are being deployed on NICs.

Regardless of the complexity or otherwise of operations performed by a NIC, it is desired that the NIC be configured to only execute the firmware or computer code which is intended.

The invention claimed is:

1. A network interface device in a first device, said network interface device comprising:
   an interface configured to receive a first input from a network; and
   at least one processor configured to provide:
      an output in dependence on contents of said first input; and
      provenance information which uniquely identifies the network interface device, said output being output via said interface to said network,
      wherein said output comprises a digest of a plurality of packets with the provenance information, the at least one processor being configured to forward said digest with the provenance information to an analytics function.

2. The network interface device as claimed in claim 1, wherein said first input comprises provenance information of at least one network interface device from which said first input has been received via said network.

3. The network interface device as claimed in claim 1, wherein said first input comprises at least one packet or at least one frame.

4. The network interface device as claimed in claim 1, wherein said provenance information is appended to one or more output packets or frames in said output.

5. The network interface device as claimed in claim 4, wherein said digest comprises a digest of provenance information associated with a plurality of network interface devices.

6. The network interface device as claimed in claim 4, wherein said digest is provided in at least one packet or frame.

7. The network interface device as claimed in claim 4, wherein said digest is appended as metadata to at least one packet or frame.

8. The network interface device as claimed in claim 1, wherein said output comprises at least one packet or frame of data.

9. The network interface device as claimed in claim 1, wherein said output comprises at least a part of at least one packet or frame of said first input with said provenance information.

10. The network interface device as claimed in claim 1, wherein said provenance information is provided in a payload of at least one packet or frame of data of said output.

11. The network interface device as claimed in claim 1, wherein said provenance information is provided as metadata.

12. The network interface device as claimed in claim 1, wherein said provenance information is provided in a field in one or more output packets or frames of said output.

13. The network interface device as claimed in claim 4, wherein said digest is a digest of data comprising at least one of:
   a digest of payload data in said first input;
   a digest of payload data in said output;
   a digest of application level objects;
   a digest of application level data units; and
   a digest of storage packet data units.

14. The network interface device as claimed in claim 1, wherein said provenance information is used to perform a hash function on at least part of data of a packet.

15. The network interface device as claimed in claim 1, wherein said output comprises provenance information associated with one or more network interface devices from which said first input was received.

16. The network interface device as claimed in claim 1, wherein said interface is configured to receive a plurality of inputs each having respective provenance information, said inputs being combined, said at least one processor being configured to provide an output comprising at least a part of provenance information associated with each of said plurality of inputs.

17. The network interface device as claimed in claim 1, wherein said at least one processor is configured to provide time stamp information in said output.

18. The network interface device as claimed in claim 1, wherein said provenance information comprises at least one of:
- an identifier of said network interface device;
- a unique serial number of said network interface device;
- an identifier of a location of said network interface device;
- an identifier of said first device;
- an identifier of a domain with which the network interface device is associated; and
- a signature using a security key of said network interface device.

19. The network interface device as claimed in claim 1, comprising at least one memory configured to store one or more rules, said at least one processor being configured to apply said rules to at least one of said input and said output, at least one rule using provenance information associated with at least one of said network interface device and a further device.

20. The network interface device as claimed in claim 19, wherein at least one of said one or more rules is configured to cause provenance information to be stored to one or more applications.

21. The network interface device as claimed in claim 19, wherein at least one of said one or more rules is configured to cause data from one or more applications to be output with provenance information associated with at least one of said network interface device and a further device.

22. The network interface device as claimed in claim 19, wherein at least one of said one or more rules is configured to generate an alert in response to one or more conditions relation to provenance information associated with at least one of said network interface device and a further device.

23. A method comprising:
- receiving a first input from a network at an interface of a network interface device in a first device; and
- the network interface device providing an output to said network via said interface in dependence on contents of said first input;
- the network interface device providing provenance information which uniquely identifies the network interface device, wherein said output comprises a digest of a plurality of packets with the provenance information; and
- forwarding said digest with the provenance information to an analytics function.

* * * * *